United States Patent
Kim et al.

(10) Patent No.: US 11,101,662 B2
(45) Date of Patent: *Aug. 24, 2021

(54) SOLAR PANEL DISCONNECT AND REACTIVATION SYSTEM

(71) Applicant: TEXAS INSTRUMENTS INCORPORATED, Dallas, TX (US)

(72) Inventors: Il Han Kim, Allemn, TX (US); Xiaolin Lu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/782,290

(22) Filed: Feb. 5, 2020

(65) Prior Publication Data
US 2020/0176992 A1 Jun. 4, 2020

Related U.S. Application Data

(63) Continuation of application No. 15/087,216, filed on Mar. 31, 2016, now Pat. No. 10,566,798.

(51) Int. Cl.
*H02J 3/38* (2006.01)
*H02S 40/32* (2014.01)
*H02S 40/34* (2014.01)

(52) U.S. Cl.
CPC ............ *H02J 3/385* (2013.01); *H02J 3/38* (2013.01); *H02S 40/32* (2014.12); *H02S 40/34* (2014.12); *Y02E 10/56* (2013.01)

(58) Field of Classification Search
CPC .......... H02J 3/385; H02S 40/32; H02S 40/34

USPC ........................................................ 307/80
See application file for complete search history.

(56) References Cited

U.S. PATENT DOCUMENTS

| | | | |
|---|---|---|---|
| 9,590,526 B2* | 3/2017 | Adest | H02J 3/381 |
| 9,647,442 B2* | 5/2017 | Yoscovich | H02S 50/00 |
| 2008/0164766 A1* | 7/2008 | Adest | H02J 3/381 |
| | | | 307/80 |
| 2009/0141522 A1* | 6/2009 | Adest | H02J 1/10 |
| | | | 363/55 |
| 2009/0184746 A1 | 7/2009 | Fahrenbruch | |
| 2009/0206666 A1 | 8/2009 | Sella et al. | |
| 2009/0283129 A1 | 11/2009 | Foss | |
| 2009/0284998 A1* | 11/2009 | Zhang | G05F 1/67 |
| | | | 363/55 |
| 2011/0084553 A1 | 4/2011 | Adest et al. | |
| 2012/0299386 A1* | 11/2012 | Kaufman | H02J 3/386 |
| | | | 307/82 |
| 2017/0222542 A1* | 8/2017 | Adest | H02J 3/386 |
| 2019/0044323 A1* | 2/2019 | Deline | H02S 40/34 |

* cited by examiner

*Primary Examiner* — Ryan Jager
(74) *Attorney, Agent, or Firm* — Brian D. Graham; Charles A. Brill; Frank D. Cimino

(57) ABSTRACT

A photovoltaic system with an inverter, at least one solar panel for providing electrical power, and electrical wiring for coupling electrical power from the at least one solar panel to the inverter. Also included is a transmitter for transmitting a messaging protocol along the electrical wiring, where the protocol includes a multibit wireline signal. Also included is circuitry for selectively connecting the electrical power from the at least one solar panel along the electrical wiring to the inverter in response to the messaging protocol.

20 Claims, 4 Drawing Sheets

SOLAR PANEL DISCONNECT AND REACTIVATION SYSTEM

CROSS-REFERENCES TO RELATED APPLICATIONS

This application is a continuation of U.S. patent application Ser. No. 15/087,216, filed Mar. 31, 2016, which is hereby incorporated by reference herein in its entirety.

STATEMENT REGARDING FEDERALLY SPONSORED RESEARCH OR DEVELOPMENT

Not Applicable.

BACKGROUND OF THE INVENTION

The preferred embodiments relate to solar panel systems and, more particularly, to disconnecting or reactivating connectivity of such panels to a power grid, for instance in connection with safety considerations.

Solar panel electrical technology dates back many decades to the discovery of the photovoltaic (PV) (i.e., solar) cell, but economic and ecologic factors are now advancing the merits of larger scale use of such technologies. As a result, solar panel systems are becoming more efficient, cost-effective, and prolific. With such advancements, aspects of solar panel systems are constantly being considered and improved, with the development of requirements or standards by certain governing bodies. In this regard, the National Electrical Code (NEC) is a regionally adoptable standard for the safe installation of various electrical equipment, which is commonly adopted in states or municipalities in the United States. The NEC has issued requirements for safety considerations in environments where PV systems are installed, so as to reduce electric shock and energy hazards for emergency personnel, such as first responders and others, who may need to work in the vicinity of a PV system. For example, NEC requirements are provided for PVRSE (PV Rapid Shutdown Equipment) and PVRSS (PV Rapid Shutdown System), where the PRVSS is to reduce or shut down energy (i.e., voltage/current) at a location(s) in the PVRSE under certain circumstances, with an aim toward safety. As another example, an uninsulated live part involving a risk of electric shock or electrical energy-high current levels shall be located, guarded, or enclosed to protect against unintentional contact by personnel who may be called on to activate the actuating device while the PV equipment is energized. As still another example, the requirements state that within 30 seconds of an actuator signal, a PVRSS shall maintain controlled conductors at a limit of not more than 30 VDC, or 15 VAC, 8 A and may not exceed 240 volt-amperes.

Given the preceding, there arises a need to address certain safety issues in the proliferation of PV systems, and the preferred embodiments are directed to such a need as further explored below.

BRIEF SUMMARY OF THE INVENTION

In a preferred embodiment, there is a photovoltaic system. The system comprises an inverter, at least one solar panel for providing electrical power, and electrical wiring for coupling electrical power from the at least one solar panel to the inverter. The system also comprises a transmitter for transmitting a messaging protocol along the electrical wiring, where the protocol includes a multibit wireline signal. The system also comprises circuitry for selectively connecting the electrical power from the at least one solar panel along the electrical wiring to the inverter in response to the messaging protocol.

Numerous other inventive aspects and preferred embodiments are also disclosed and claimed.

DETAILED DESCRIPTION OF EMBODIMENTS

Figure 1:
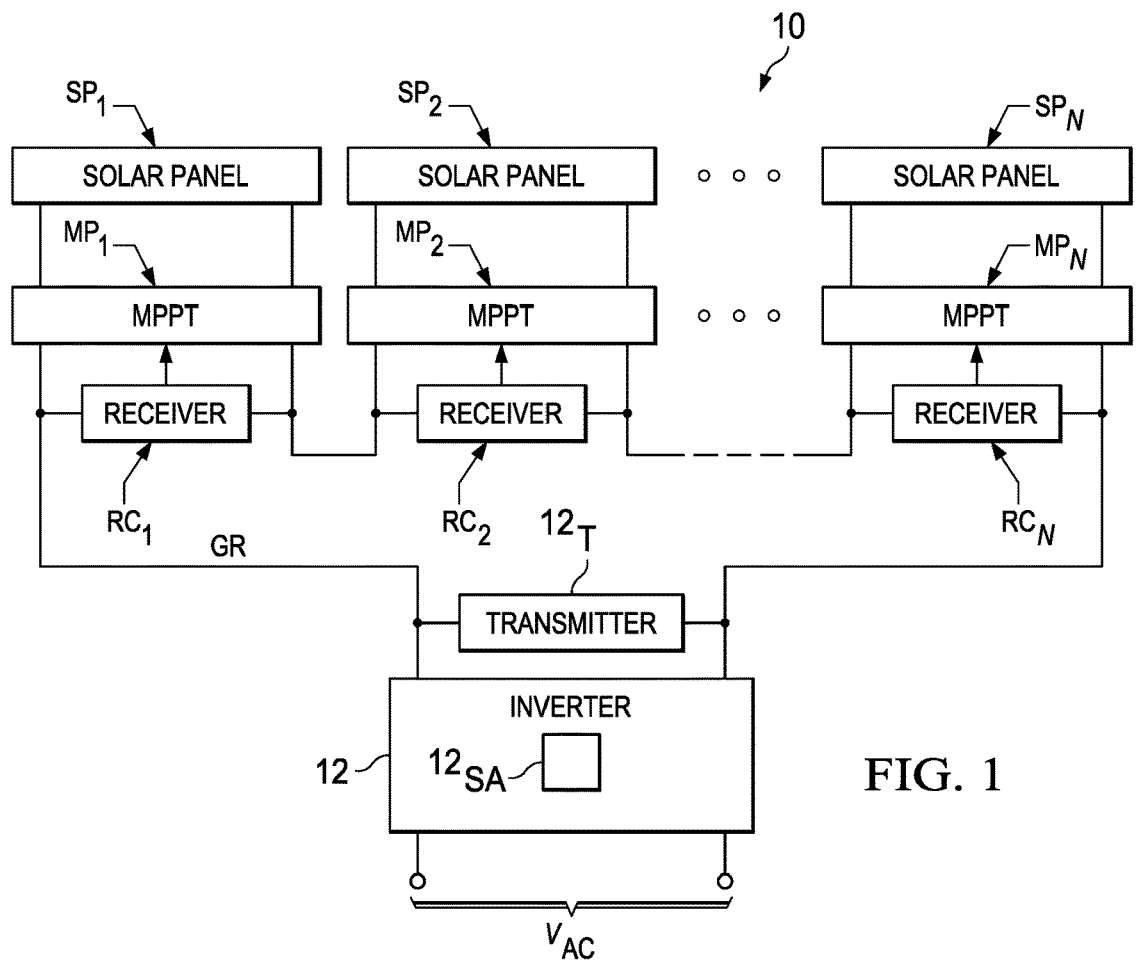
FIG. 1 illustrates an electrical block diagram of a PV system according to a preferred embodiment.

FIG. 1 illustrates an electrical block diagram of a photovoltaic (PV) system 10, according to a preferred embodiment. System 10 includes various aspects known in the art which are first described here, followed by additional preferred embodiment aspects described in the remainder of this document. Looking first to the former, system 10 includes a number N of solar panels, shown by way of example in FIG. 1 as solar panel $SP_1$, panel $SP_2$, ..., through panel $SP_N$. Each solar panel is connected, typically by parallel electrical connection, to a respective maximum power point tracker (MPPT) $MP_1$, $MP_2$, ..., $MP_N$. As is well known, each solar panel $SP_x$ is operable to convert incident solar energy (i.e., from the sun) to a DC voltage, and each such MPPT $MP_x$ is a DC to DC converter that optimizes the match between each solar panel $SP_x$ and the rest of an electrical grid GR that connects the energy from multiple panels together and to other devices connected to grid GR. Further, grid GR connects the plurality of MPPTs in a wired fashion, shown as a serial connection in FIG. 1, and the total potential provided by the collective serial path is connected to an inverter 12. Inverter 12 converts the DC voltage provided from the solar panels/MPPTs to an AC signal, $v_{AC}$, where the latter is typically output at a level (e.g., 110 volts AC) to accommodate the voltage requirements of equipment or devices that will use the electricity generated by system 10. Lastly, note that various other items are known in the art and may be connected to the electrical grid of FIG. 1, including batteries; such items are not shown in FIG. 1, however, to focus the discussion on remaining preferred embodiment aspects described below.

Looking to additional preferred embodiment aspects of system 10, its wireline connection is further enhanced to include apparatus for wireline network communications so as to achieve rapid shutdown, and controlled reactivation, of electrical connectivity to each of solar panels $SP_1$ through $SP_N$. In this regard, inverter 12 includes a safety actuator $12_{SA}$, which may be an electrical, mechanical, or graphical operable button or interface that, when actuated, will commence a process to interrupt the supply of electricity from a solar panel $SP_x$, or more than one solar panel, to grid GR. Further in this regard, safety actuator $12_{SA}$ may be a user-operated control, such as by an administrator or other personnel who, for safety purposes, desires to remove the electrical provision from a solar panel $SP_x$ to grid GR, such as when responding to an emergency or comparable situation that involves system 10. As another example, safety actuator $12_{SA}$ may be software and/or hardware that detects a condition and, in response yet without user-intervention, operates safety actuator $12_{SA}$ so as to instigate the solar panel electrical shutdown process; for example, such a condition may be a detected arc or electrical spike. Moreover, safety actuator $12_{SA}$ also is operable to control the re-connection or reactivation of power supply from one or more solar panels to grid GR. Thus, as detailed below, safety actuator $12_{SA}$ along with other circuitry provides selective connectivity as between solar panel energy and grid GR, whereby in some instances the connection between the two is enabled and electricity couples between the two, while in other instances the connection between the two is interrupted so that electricity is not coupled between the two.

Further in the preferred embodiment, a transmitter $12_T$ is associated with inverter 12, such as being incorporated inside the housing of inverter 12 or connected to the same wireline connections of inverter 12, where for sake of example in FIG. 1 transmitter $12_T$ is shown connected in parallel to the conductors connected to inverter 12. Transmitter $12_T$, as further detailed below, is operable to transmit signals along grid GR so as to facilitate the function of safety actuator $12_{SA}$, that is, when safety actuator $12_{SA}$ is to commence a shutdown or reactivation of a solar panel connection to grid GR, then transmitter $12_T$ communicates appropriate signaling to achieve such a result. Further in this regard, each of solar panel $SP_1$, $SP_2$, . . . , $SP_N$ incorporates, or is connected to, a respective receiver $RC_1$, $RC_2$, . . . , $RC_N$. Thus, a receiver $RC_x$ also may be incorporated inside the housing of its respective solar panel $SP_x$ or connected to the same wireline connections of that panel, where for sake of example in FIG. 1 each such receiver $RC_x$ is shown connected in parallel to the conductors connected to its respective solar panel $SP_x$. In general, transmitter $12_T$, and each of the receivers $RC_1$, $RC_2$, . . . , $RC_N$, may be constructed with various hardware and software, as ascertainable by one skilled in the art, so as to achieve the functionality including communications and protocol described in this document.

Each receiver $RC_x$ is also shown with a control connection (by way of an arrow) to a respective MPPT $MP_x$; for example, receiver $RC_1$ has a control connection to MPPT $MP_1$, $MP_2$, and so forth. By this control, each receiver may signal its respective MPPT to electrically isolate its respective solar panel $SP_x$ from providing electricity to grid GR; for example, receiver $RC_1$ may control MPPT $MP_1$ so that solar panel $SP_1$ cannot provide current to inverter 12. In this regard, therefore, switching circuitry is included in each MPPT $MP_x$, whereby the connectivity from the solar panel $SP_x$, through the MPPT $MP_x$ and to inverter 12, may be interrupted, such as through an open circuit (e.g., relay, switch, or other element for preventing current flow). Likewise, such circuitry may be controlled to reconnect or reactivate this open circuit so as to restore electrical power provision by a solar panel $SP_x$ to grid GR.

Operation of safety actuator $12SA$ of inverter 12 to control solar panel connectivity is accomplished in a preferred embodiment by a messaging protocol between inverter 12 and either the solar panels or some other circuitry, where in a preferred embodiment such circuitry are the MPPTs, that can open/close the connectivity between a solar panel (or group of panels) and grid GR. In one preferred embodiment, the messaging protocol uses a singular message to control all solar panels, while in an alternative preferred embodiment, different messages according to a protocol correspond to respective groups of one or more panels, where each group will respond to its respective signal. Each of these alternatives is described below.

Figure 2:
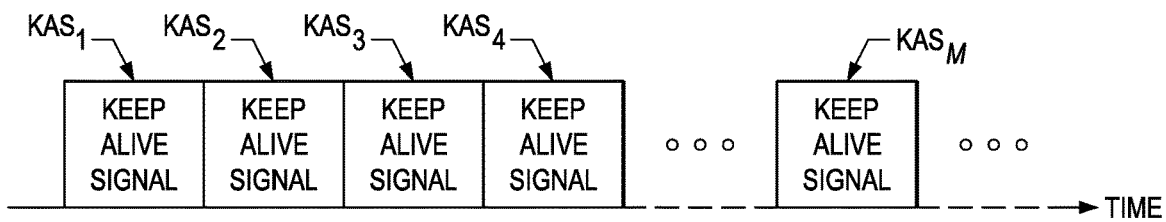
FIG. 2 illustrates a messaging protocol with a single message for controlling connectivity of all solar panels.

FIG. 2 illustrates a messaging protocol with a single message for controlling connectivity of all solar panels. As shown in FIG. 2, transmitter $12_T$ preferably communicates the messaging protocol along the wireline connectivity of FIG. 1, as an ongoing stream of what will be referred to herein as Keep-Alive signals. As a wireline communication, various of the complexities and costs associated with the alternative of wireless communications is avoided. In any event, a continuous stream of Keep-Alive signals are shown in FIG. 2, sequentially following one another in time, where each such signal is alike, that is, contains the same information as the other such signals. As further detailed later, each receiver $RC_x$ evaluates signaling along the connections to that receiver so as to detect such Keep-Alive signals, and as long as such detection occurs with sufficiency over time, the receiver $RC_x$ control to its respective $MPPT_x$ is such that the corresponding solar panel $SP_x$ continues to supply current to grid GR. However, if a receiver $RC_x$ fails to detect a sufficient quantity of such Keep-Alive signals during a given period of time, then the receiver $RC_x$ controls its respective $MPPT_x$ so as to disconnect its respective solar panel $SP_x$ from supplying current to grid GR. In the latter instance, therefore, safety considerations such as those arising from the NEC can be achieved, by quickly, efficiently, and reliably shutting down the receipt of power by grid GR from a solar panel $SP_x$.

Figure 3:
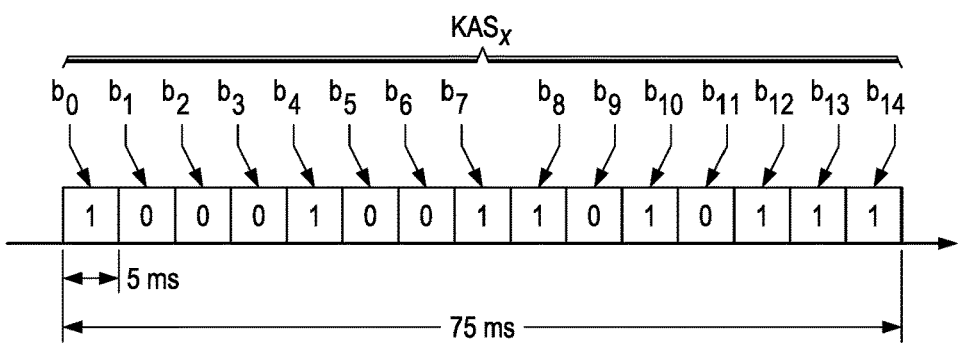
FIG. 3 illustrates an exemplary view of a single Keep-Alive signal $KAS_x$ from FIG. 2.

FIG. 3 illustrates an expanded view of a single Keep-Alive signal $KAS_x$ from FIG. 2. In a preferred embodiment, each Keep-Alive signal $KAS_x$ is a 15 bit signal (shown as bits $b_0$ through $b_{14}$), where each bit is communicated across a 5 millisecond (ms) duration, so that the entire Keep-Alive signal $KAS_x$ transmission period is 75 ms. Moreover, each bit is preferably transmitted by transmitter $12_T$ using frequency shift keying (FSK) modulation. As known in the FSK art, each of the binary values is transmitted at a differing frequency, where the 1 is called the mark frequency $f_M$ and the 0 is called the space frequency $f_S$, where such frequency differentiation improves proper signal detection if one of the frequencies is more susceptible to poor channel quality. Additionally, when the channel is limited by random additive noise, an SNR improvement of 10 $\log_{10}(15)$=11.8 dB is obtained by encoding the Keep-Alive signal into a 15-bit sequence as shown in FIG. 3, where preferably the sequence is pseudo-orthogonal with respect to any random sequences. Still further, note that each Keep-alive signal consists solely of data bits, with no overhead required to limit different portions of a packet or frame, such as a separate header, payload, and possible accuracy check (e.g., CRC) or other frame terminating field. Accordingly and as detailed below, each of the receivers $RC_x$ evaluates grid GR for a signal presence at either of frequencies $f_M$ and $f_S$ to thereby detect an incoming Keep-Alive signal. Moreover, where in one preferred embodiment the Keep-Alive signals are transmitted without a pause or time space between successive signals and with a continuous phase transition, then a correlator may be implemented in each receiver $RC_x$. Thus, with knowledge of the bit pattern of the Keep-Alive signal, then should the Keep-Alive signal arrive within a 75 ms window of time, a peak will be detected by the correlator when autocorrelation is high, thereby confirming the presence of the Keep-Alive signal. As further detailed below, such a signal detection will maintain the connectivity of a solar panel $SP_x$, or group of solar panels, to grid GR. Moreover, with continuous phase transition, note that such detection may occur without any additional synchronization or messaging overhead as between transmitter $12_T$ and the receivers $RC_1$ through $RC_N$.

Figure 4:
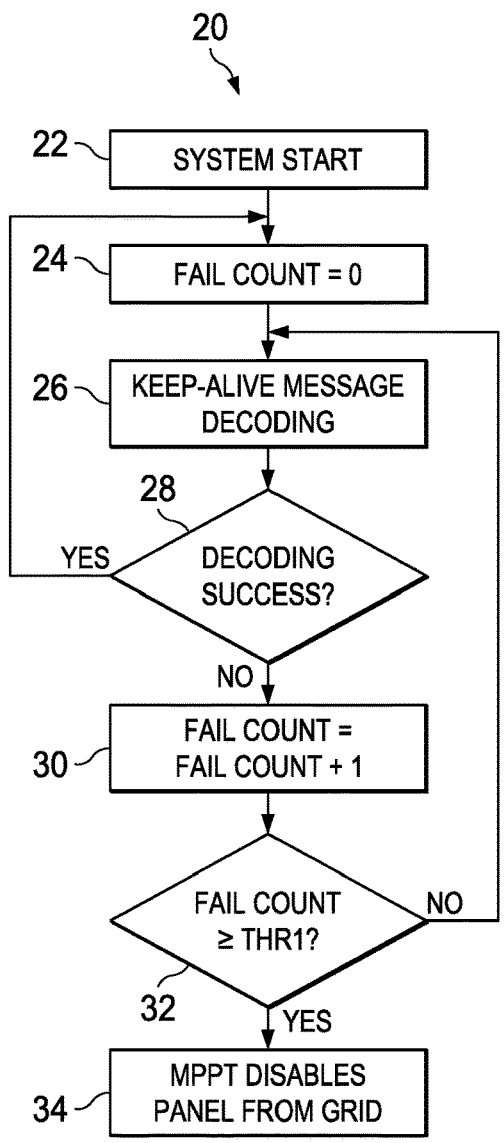
FIG. 4 illustrates a flowchart of a preferred embodiment method 20 of operation of each receiver $RC_x$ to sample signals on grid GR so as to detect the presence, or lack thereof, of a stream of Keep-Alive signals and to respond appropriately.

FIG. 4 illustrates a flowchart of a preferred embodiment method 20 of operation of each receiver $RC_x$ to sample signals on grid GR so as to detect the presence, or lack thereof, of a stream of Keep-Alive signals and to respond appropriately. Method 20 commences with a system start step 22, illustrating start-up of system 10 according to principles known in the art. Accordingly, assuming proper operation, then in step 22 each solar panel $SP_x$ provides electrical energy to its corresponding MPPT $MP_x$, and with any power conversion needed of the solar-panel-provided energy as also known in the art, each corresponding MPPT $MP_x$ provides a corresponding electrical signal to grid GR. Meanwhile, assuming no activation of safety actuator $12_{SA}$, then inverter 12 provides an ongoing sequence of recurrent Keep-Alive signals, as shown in FIG. 2, to grid GR. Next, method 20 continues from step 22 to step 24.

In step 24, each receiver $RC_x$ initiates to zero a parameter shown as FAIL COUNT. As its name suggest, the parameter FAIL COUNT represents a counter for reach receiver $RC_x$, indicating a count of the number of times that the receiver $RC_x$ fails to detect the presence of a Keep-Alive signal. After step 24, method 20 continues to step 26.

In step 26, each receiver $RC_x$ samples grid GR in an effort to detect the presence of a Keep-Alive signal. In a preferred embodiment, the sample period of step 26 is equal to the transmission period of the Keep-Alive signal, which in the example of FIG. 3 is 75 ms. Thus, step 26 determines whether a Keep-Alive signal is detected in 75 ms and, as introduced earlier, one manner of such detection is by performing a correlation in the receiver using the known 15-bit sequence of the Keep-Alive signal with FSK bits detected at either the $f_M$ or $f_S$ frequencies. Next, method 20 continues from step 26 to step 28.

In step 28, each receiver $RC_x$ determines whether its preceding step 26 decoding operation detected a valid Keep-Alive signal during the monitored transmission period. If the correlation locates an adequate peak within the sampled transmission period thereby indicating such a detection, then the method flow returns from step 28 to step 24. Thus when a receiver detects a single valid Keep-Alive signal, the FAIL COUNT is again reset to zero, and the next decoding step repeats. If, however, step 28, determines that the step 26 decoding step failed to detect a valid Keep-Alive signal during the monitored transmission period, then method 20 continues from step 28 to step 30.

In step 30, each receiver $RC_x$ increments its FAIL COUNT parameter by one. For example, therefore, if FAIL COUNT was formerly a value of zero, such as for a first instance of steps 26 and 28, then following step 30 FAIL COUNT will equal one. As introduced earlier, therefore, the parameter FAIL COUNT continues to keep a count of a number of successive transmission periods where a valid Keep-Alive signal is not detected. As shown above, however, when FAIL COUNT is non-zero and a valid Keep-Alive signal is detected, then such an event produces an affirmative finding in step 28 and causes FAIL COUNT to reset to zero. To the contrary, each time FAIL COUNT is incremented, next a step 32 is performed, to determine if FAIL COUNT exceeds some integer threshold THR1, where the value of THR1 may be selected by one skilled in the art, for example after empirical testing of system 10. If step 32 determines that FAIL COUNT does not exceed THR1, then method 20 returns from step 32 to step 26, with FAIL COUNT therefore then being greater than zero. To the contrary, if step 32 determines that FAIL COUNT equals (or exceeds) THR1, then method 20 continues from step 32 to step 34.

From the preceding, one skilled in the art should appreciate that step 34 is reached only when a successive number of transmission periods (e.g., 75 ms intervals) equal to THR1 are sampled by a receiver $RC_x$, and for each such period a valid Keep-Alive signal is not detected. Under such conditions, in step 34 the receiver RCs signals its respective MPPT $MP_x$ to disable the connectivity between its respective solar panel $SP_x$ and grid GR. Thus, in summary, method 20 demonstrates that in one preferred embodiment, each receiver $RC_x$ samples signaling on grid GR, and if a number equal to THR1 sequential transmission periods occur without the receiver detecting a valid Keep-Alive signal, then the solar panel $SP_x$ corresponding to that receiver is thereby prevented from providing energy to grid GR. With this understanding, and returning to FIG. 1, note therefore that when normal full power-generation of system 10 is desired, then transmitter $12_T$ continuously transmits Keep-Alive signals as shown in FIG. 2, but when safety actuator $12_{SA}$ is activated to disconnect power to grid GR, then transmitter $12_T$ discontinues the transmission of Keep-Alive signals; in response, once a number of transmission periods equal to THR1 elapse without a Keep-Alive signal having been transmitted during that entire duration, each MPPT $MP_x$ is signaled to prevent its corresponding solar panel $SP_x$ from providing energy to grid GR. Thus, activation of safety actuator $12_{SA}$ in this manner will timely and efficiently cause the disruption of power to grid GR from one or more solar panels, in just over the time to detect the entire duration of THR1 times the Keep-Alive signal transmission period.

As another aspect of a preferred embodiment, structure and functionality are included so as to reactivate a connection between solar panels and grid GR, following a disconnection from an incidence of step 34. In this regard, reactivation is controlled via inverter 12 and its associated transmitter $12_T$, where for example safety actuator $12_{SA}$ may include an additional control, button, interface, or event, whereupon activation of any of these attributes transmitter $12_T$ will re-commence sending Keep-Alive signals along grid GR, and upon receipt of a sufficient number of these signals within a predetermined period, solar panel energy that was formerly disconnected from grid GR is re-established. In this regard, FIG. 5 illustrates one preferred embodiment method 40 consistent with the above, which is now discussed.

Figure 5:
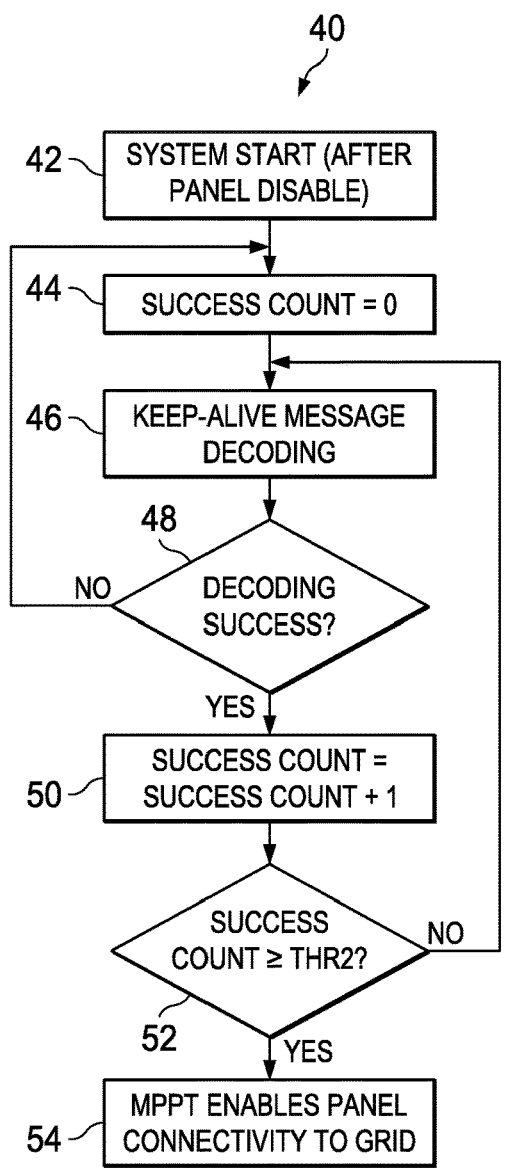
FIG. 5 illustrates a flowchart of a preferred embodiment method for detecting the presence of, preferably consecutive, Keep-Alive signals and the appropriate response of reactivating a connection between a solar panel $SP_x$ and grid GR.

FIG. 5 illustrates a flowchart of a preferred embodiment method 40 of operation of each receiver $RC_x$ that is comparable in numerous respects to method 20 of FIG. 4, so FIG. 5 is discussed in less detail as the reader is assumed familiar with the earlier discussion. In method 40, again each receiver $RC_x$ samples signals on grid GR to detect the presence, or lack thereof, of a stream of Keep-Alive signals. In method 40, however, the presence of, preferably consecutive, Keep-Alive signals will be detected and the appropriate response of reactivating a connection between solar panel $SP_x$ and grid GR will be achieved.

Method 40 commences with a system start step 42, illustrating start-up of system 10 after a solar panel $SP_x$ has been disconnected from supplying energy to grid GR in accordance with method 20 of FIG. 4. Thereafter, in step 44, a receiver $RC_x$ corresponding to the disconnected solar panel $SP_x$ initiates to zero a parameter shown as SUCCESS COUNT. As its name suggest, the parameter SUCCESS COUNT represents a counter for reach receiver $RC_x$, indicating a count of the number of times that the receiver $RC_x$ successfully detects the presence of a Keep-Alive signal. After step 44, method 40 continues to step 46.

Step 46, and the step 48 following it, perform the same functionality as steps 26 and 28 of FIG. 4. Thus, in step 46 a receiver $RC_x$ samples grid GR to detect the presence of a Keep-Alive signal over the transmission period of that signal, and in step 48 a receiver $RC_x$ determines whether its preceding step 46 decoding step detected a valid Keep-Alive signal during the monitored transmission period. In step 48, however, the direction of flow is reversed, relative to step 28, based on either a negative or affirmative determination of the step 48 condition. In other words, if in step 48 no Keep-Alive signal was detected in the preceding step 46, then method 40 returns to step 44 and the SUCCESS COUNT is reset to (or remains at) zero, and the decoding step 46 repeats. If, however, step 48, determines that the step 46 decoding step indeed detected a valid Keep-Alive signal during the monitored transmission period, then method 40 continues from step 48 to step 50.

In step 50, a receiver $RC_x$ increments its SUCCESS COUNT parameter by one. Thus, the parameter SUCCESS COUNT keeps a count of a number of successive transmission periods where a valid Keep-Alive signal is detected, following a time where the solar panel $SP_x$ corresponding to the receiver $RC_x$ was disconnected from grid GR. Each time SUCCESS COUNT is incremented by a step 50, next a step 52 is performed, to determine if SUCCESS COUNT exceeds some integer threshold THR2, where the value of THR2 may be selected by one skilled in the art, again for example after empirical testing of system 10, but where preferably THR2 of step 52 is greater than THR1 of step 32 from FIG. 4. If step 52 determines that SUCCESS COUNT does not exceed THR2, then method 40 returns from step 52 to step 46, with SUCCESS COUNT therefore then being greater than zero. To the contrary, if step 52 determines that SUCCESS COUNT equals (or exceeds) THR2, then method 40 continues from step 52 to step 54.

From the preceding, one skilled in the art should appreciate that step 54 is reached only when successive a number of transmission periods (e.g., 75 ms intervals) equal to THR2 are sampled by a receiver $RC_x$, and for each such period a valid Keep-Alive signal is detected. Under such conditions, in step 54 the receiver $RC_x$ signals its respective MPPT $MP_x$ to enable or reactivate the connectivity between its respective solar panel $SP_x$ and grid GR. Thus, in summary, method 40 demonstrates that in one preferred embodiment, after a solar panel $SP_x$ has been disconnected from grid GR, then its corresponding receiver $RC_x$ samples signaling on grid GR, and if a successive number equal to THR2 of Keep-Alive signals are detected, then the solar panel $SP_x$ corresponding to that receiver $RC_x$ is thereby reconnected to provide energy to grid GR. Thus, recalling that safety actuator $12_{SA}$ is operable to re-commence sending Keep-Alive signals along grid GR after a panel has been disconnected from the grid, method 40 therefore will, upon receipt of a sufficient number of these signals within a predetermined period, reconnect a solar panel $SP_x$ to provide energy to grid GR where that connection was formerly disconnected.

Figure 6:
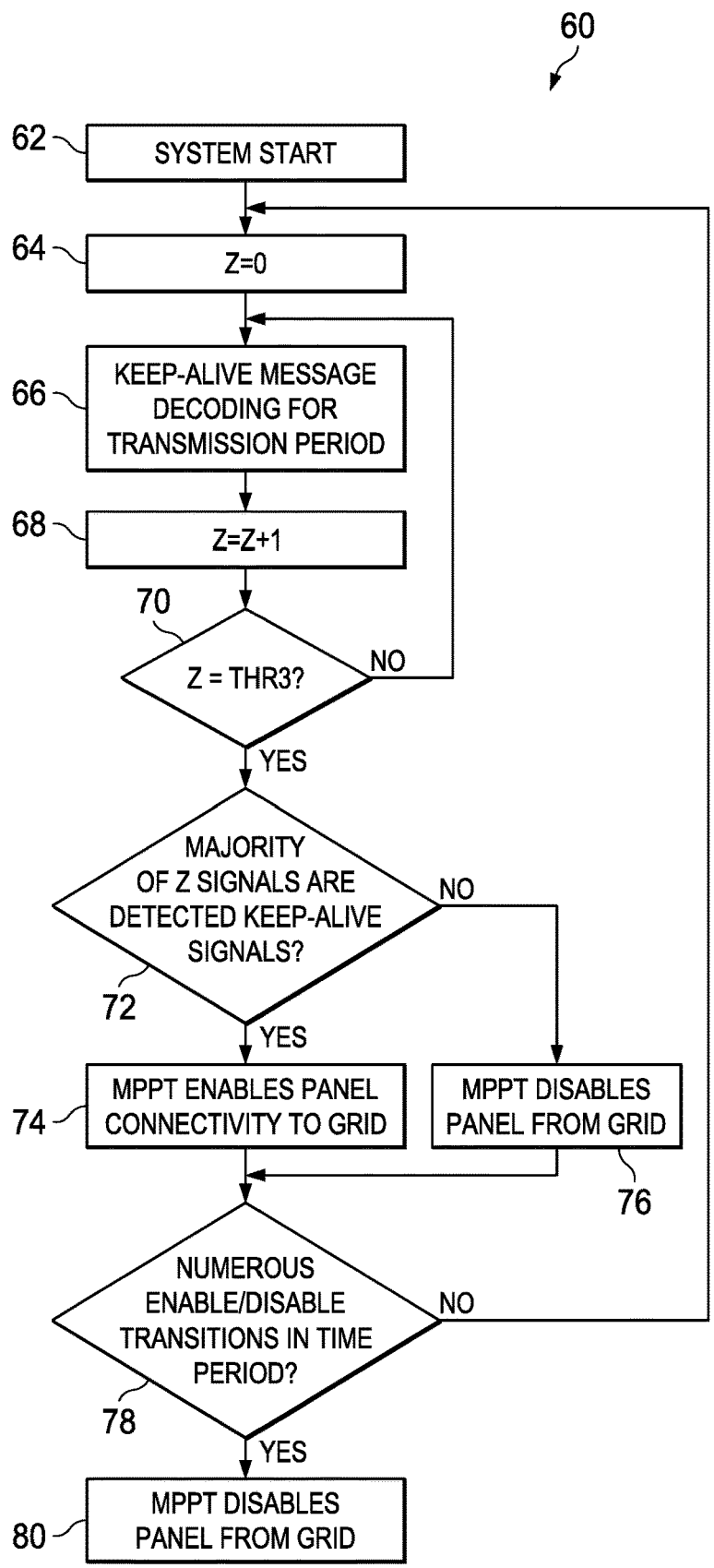
FIG. 6 illustrates an alternative methodology for detecting Keep-Alive signals and either enabling or disabling the connectivity of a solar panel $SP_x$ to grid GR according to a majority decoding methodology.

FIG. 6 illustrates an alternative preferred embodiment methodology for detecting Keep-Alive signals and either enabling or disabling the connectivity of a solar panel $SP_x$ to grid GR, that is, as an alternative to methods 20 and 40 of FIGS. 4 and 5, respectively. By way of introduction, whereas methods 20 and 40 operate in response to each successive Keep-Alive signal transmission period and control may be altered based on a single Keep-Alive signal (e.g., as received in step 26 or failed to be received in step 46), method 60 performs a majority decoding process over an odd number Z of Keep-Alive signal transmission periods, whereby the majority of detected signals, or lack thereof, during the Z periods, causes the resultant control to either connect or disconnect a solar panel $SP_x$ with respect to grid GR. Examples of specific steps to achieve such functionality are described below.

Method 60 commences with a system start step 62, illustrating an initial default state of system 10, which could be established such that all solar panels are connected (i.e., via respective MPPTs) to grid GR, or alternatively for a safety mode could be such that all solar panels are disconnected from grid GR. Next, in step 64, each receiver $RC_x$ initiates to zero an index parameter shown as Z, and method 60 continues to step 66. In step 66, each receiver $RC_x$ samples grid GR in an effort to detect the presence of a Keep-Alive signal, in the same manner as described earlier for step 26 (or step 46). Then, in step 68, the index parameter Z is incremented, after which method 60 continues to step 70.

Step 70 is a conditional step so that overall method 60 will analyze a total number of sample periods (i.e., transmission periods) equal to an odd number value shown as THR3. Thus, step 70 determines whether step 66 has been repeated a total of THR3 times, where if the total is not reached, method 60 loops back to decode another transmission period and again increment the index Z, and once the total of THRE3 is reached method 60 continues to step 72.

In step 72, each receiver $RC_x$ performs a majority decode on the THR3 samples periods that have been decoded by repeated instances of step 66, so as to determine whether the majority of those periods detected a valid Keep-Alive signal. In other words, since THR3 is an odd number, then step 72 determines whether a majority of the transmission periods in the THR3 transmission periods were occupied by a valid Keep-Alive signal. For example, if THR3 is 9 periods, then step 72 determines if at least 5 of those periods (i.e., ROUNDUP(THR3/2)=ROUNDUP(9/2)=5) presented a valid Keep-Alive signal. If the majority of the THR3 periods detected a valid Keep-Alive signal, then method 60 continues to step 74, which like step 54 in FIG. 5, controls an MPPT $MP_x$ to enable the connectivity of the corresponding solar panel $SP_x$ to grid GR. In opposite fashion, if the majority of the THR3 periods failed to detect a valid Keep-Alive signal, then method 60 continues to step 76, which like step 44 in FIG. 4, controls an MPPT $MP_x$ to disable the connectivity of the corresponding solar panel $SP_x$ from grid GR. After either step 74 or step 76, method 60 continues to a step 78, which provides an additional fail-safe evaluation. Specifically, step 78 determines whether a number of on/off transitions from alternate occurrences of steps 74 and 76 have occurred in less than some time period threshold; if this has occurred, such transitioning may be cause for concern and, as a result, method 60 continues from step 78 to step 80, which like step 76, disables connectivity of the corresponding solar panel $SP_x$ from grid GR due to the relatively frequent on/off transitions (where one skilled in the art may select an appropriate number and time period threshold for step 78). To the contrary, if step 78 does not detect such repeated transitions, method 60 returns to step 64, whereupon a next set of THR3 transmission periods may be analyzed in a comparable manner as described above.

With method 60, one skilled in the art may choose the value of Z given a tradeoff in that the larger the value of Z, the longer amount of time required before step 72 is reached, that is, the larger the value of Z, the greater amount of time will elapse between actuation of safety actuator $12_{SA}$ and the responsive action of either step 74 or step 76. Specifically, such amount of time will be at least equal to Z times the Keep-Alive signal transmission period (e.g., 75 ms). In accordance with the preferred embodiments, therefore, Z is either equal to seven or nine, as testing has indicated that error production for such numbers should be sufficient. Specifically, such testing considers potential errors in the operation, such as a first error where a solar panel $SP_x$ remains connected undesirably after transmission of the Keep-Alive signal ceases, or such as a second error where a solar panel $SP_x$ is reconnected to grid GR even though a sufficient number of Keep-Alive signals have not been transmitted. Testing, however, is believed to predict that for Z=9, a chance of such an error is only one percent during many centuries (if not longer) of operation.

Figure 7:
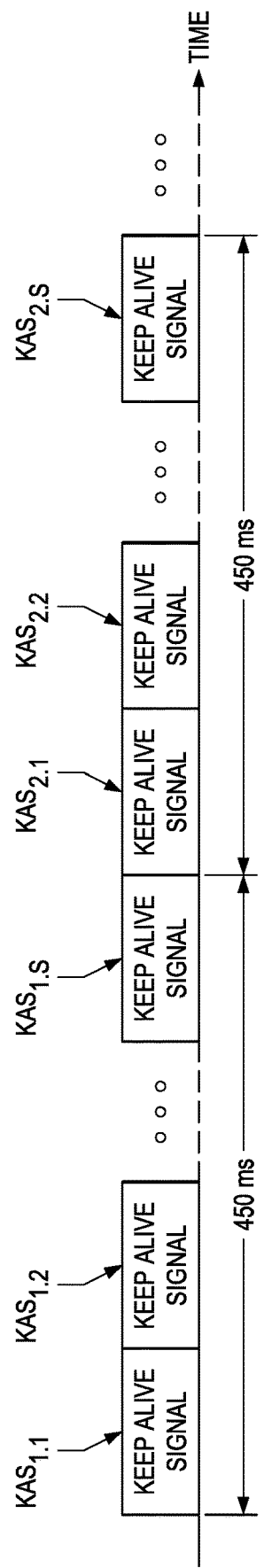
FIG. 7 illustrates an alternative messaging protocol of an ongoing stream of Keep-Alive signals, with groups of S 15-bit Keep-Alive signals and each signal differs in its binary values from the other signals in the group.

The above has described how each receiver $RC_x$ responds to a same singular 15-bit code (e.g., FIG. 3) to cause either connection or disconnection of a respective solar panel $SP_x$ to grid GR, but recall earlier mentioned is that an alternative preferred embodiment provides control of groups of solar panels. In this regard, FIG. 7 illustrates an alternative messaging protocol, whereby to maintain solar panel connectivity to grid GR, transmitter $12_T$ again communicates along the wireline connectivity of FIG. 1 an ongoing stream of Keep-Alive signals, but in FIG. 7 the stream includes groups of S 15-bit Keep-Alive signals, where each of the S signals in a group preferably has a same transmission duration (e.g., again, 75 ms) but differs in its binary values from the other signals in the group, preferably selected from a set of pseudo-orthogonal signals, and where each such signal is for controlling a separate set of one or more MPPTs (and the grid connectivity of their corresponding solar panels). For example, assume that S=4, then FIG. 7 is intended to illustrate that in a first transmission period of S transmission periods, a first Keep-Alive signal $KAS_{1.1}$ is transmitted, followed in continuous phase transition by a second Keep-Alive signal $KAS_{1.2}$, followed by a third and so forth up through the $S^{th}$ (i.e., fourth) Keep-Alive signal $KAS_{1.S}$, for a total duration of S times the individual Keep-Alive signal transmission period of time (i.e., 4*75 ms=300 ms). Thereafter, the entire sequence of S Keep-Alive signals is re-transmitted, and so forth, so long as connectivity is desired as between each group of solar panels and grid GR.

Given the sequence of FIG. 7, the alternative preferred embodiment modifies any of FIGS. 4, 5, and 6, whereby each receiver $RC_x$ performs its decoding step only with respect to the 15-bit sequence that is assigned to that particular receiver. For example, assume that system 10 includes a total of eight solar panels $SP_1$ through $SP_8$, where the solar panels are paired with respect to a controlling Keep-Alive signal; thus, as an example, panels $SP_1$ and $SP_2$, and their respective receivers $RC_1$ and $RC_2$, are responsive to the first Keep-Alive signal $KAS_{1.1}$, while panels $SP_3$ and $SP_4$, and their respective receivers $RC_3$ and $RC_4$, are responsive to the second Keep-Alive signal $KAS_{1.2}$, and so forth, as shown in the following Table 1:

TABLE 1

| Solar panel, receiver | Controlling Keep-Alive signal |
|---|---|
| $SP_1$, $RC_1$ | $KAS_{1.1}$ |
| $SP_2$, $RC_2$ | $KAS_{1.1}$ |
| $SP_3$, $RC_3$ | $KAS_{1.2}$ |
| $SP_4$, $RC_4$ | $KAS_{1.2}$ |
| $SP_5$, $RC_5$ | $KAS_{1.3}$ |
| $SP_6$, $RC_6$ | $KAS_{1.3}$ |
| $SP_7$, $RC_7$ | $KAS_{1.4}$ |
| $SP_8$, $RC_8$ | $KAS_{1.4}$ |

Given the controlling signals as shown in Table 1, then each receiver $RC_x$ performs its decoding step (i.e., either 26, 46, or 66) for a duration equal to S times the individual signal transmission period (e.g., 300 ms), so as to determine if its individual 75 ms signal is detected during that same time. Because the preferred embodiment implements pseudo-orthogonal bit sequences in the set of S Keep-Alive signals, a satisfactory correlation detection should be provided for each of the different signals. Beyond this change, any of methods 20, 40, or 60 may be followed, applying the remaining steps with respect to a receiver and its corresponding Keep-Alive signal. For example, in the instance of Table 1, receiver $RC_1$, if performing method 60, will attempt to locate Keep-Alive message $KAS_{1.1}$ during a first 300 ms interval, after which the Z index is incremented and the process repeats until THR3 such 300 ms intervals are sampled; thereafter, receiver $RC_1$ will control MPPT $MP_1$ to either connect solar panel $SP_1$ to grid GR if the majority of Z sampling periods decoded a valid Keep-Alive message $KAS_{1.1}$ or it will control MPPT $MP_1$ to disconnect solar panel $SP_1$ from grid GR if the majority of Z sampling periods failed to locate a valid Keep-Alive signal $KAS_{1.1}$ during that interval. Meanwhile, during this same time interval, the other receivers will likewise operate with respect to their respective Keep-Alive signals. For example, receiver $RC_8$, while also performing method 60, will attempt to locate Keep-Alive message $KAS_{1.4}$ during the same first 300 ms interval in which receiver $RC_1$ is sampling for Keep-Alive message $KAS_{1.1}$, after which the Z index is incremented and the process repeats until THR3 such 300 ms intervals are sampled; thereafter, receiver $RC_8$ will control MPPT $MP_8$ to either connect solar panel $SP_8$ to grid GR if for the interval the majority of Z sampling periods decoded a valid Keep-Alive message $KAS_{1.4}$, or it will control MPPT $MP_8$ to disconnect solar panel $SP_8$ from grid GR if for the interval the majority of Z sampling periods failed to locate a valid Keep-Alive signal $KAS_{1.4}$ during that period. One skilled in the art should readily appreciate the comparable operation of the remaining receivers and respective MPPT/panels, in implementing any of methods 20, 40, or 60.

Given the preceding, the preferred embodiments provide an improved PV (solar panel) system operable to disconnect or reactivate connectivity of such panels to a power grid, for instance in connection with safety considerations. While various aspects have been described, substitutions, modifications or alterations can be made to the descriptions set forth above without departing from the inventive scope. For example, while system 10 includes one receiver per solar panel/MPPT pair, in an alternative preferred embodiment a single receiver could be used to control multiple MPPTs, and the solar panel connectivity to those MPPTs. As another example, while the messaging protocol has been shown to provide bits for enabling solar panel connectivity to the grid, such bits, or alternative sets of bits, also may be used to provide additional commands. As still another example, while method 60 is described in connection with sampling successive time periods of Z times the Keep-Alive signal transmission period, in an alternative preferred embodiment a sliding window of time may be used such that the most recent THR3 sample periods are analyzed in connection with the majority decoding decision. As still another example, various of the flowchart steps may be re-ordered or further modified (including adding additional steps), and sizing of parameters may be adjusted, such as changes to any of signal bit size, transmission period, THR1, THR2, THR3, N, Z, and so forth. Still other examples will be ascertainable by one skilled in the art and are not intended as limiting to the inventive scope, which instead is defined by the following claims.

The invention claimed is:

1. A system comprising:
a power source;
switching circuitry that includes:
   a set of inputs coupled to the power source;
   a set of outputs operable to couple to a DC power grid such that the power source is coupled to the DC power grid via the switching circuitry; and
   a control input; and
a receiver operable to couple to the DC power grid in parallel with the switching circuitry, wherein:
   the receiver includes a counter and a control output coupled to the control input of the switching circuitry; and
   the receiver is operable to:
      monitor for a signal on the DC power grid;
      increment the counter in response to the signal;
      reset the counter in response to an absence of the signal; and
      cause the switching circuitry to couple and decouple the power source from the DC power grid in response to the counter.

2. The system of claim 1, wherein the signal is in a frequency shift keying (FSK) modulated messaging protocol.

3. The system of claim 1, wherein the signal encodes a sequence of bits.

4. The system of claim 3, wherein:
the signal is a first signal;
the sequence of bits is a first sequence of bits;
the receiver is operable to increment the counter in response to the first signal that encodes the first sequence of bits; and
the receiver is operable to ignore a second signal on the DC power grid that encodes a second sequence of bits that is different from the first sequence of bits.

5. The system of claim 4, wherein the first sequence of bits and the second sequence of bits are pseudo-orthogonal.

6. The system of claim 4, wherein the first signal and the second signal are transmitted without a time space between.

7. The system of claim 1 further comprising a transmitter operable to couple to the DC power grid and to provide the signal over the DC power grid.

8. The system of claim 7 further comprising an inverter that includes:
a set of inputs operable to couple to the DC power grid in parallel with the transmitter;
a set of outputs operable to couple to an AC power grid; and
inverting circuitry operable to provide power on the AC power grid using power on the DC power grid.

9. The system of claim 1 further comprising a DC to DC converter operable to convert a first DC voltage of the power source to a second DC voltage of the DC power grid.

10. The system of claim 1, wherein the receiver is further operable to:
detect a number of transitions of the switching circuitry between coupling and decoupling the power source from the DC power grid within a time period; and
cause the switching circuitry to decouple the power source from the DC power grid in response to the number of transitions.

11. A device comprising:
switching circuitry operable to couple a power source to a DC power grid, wherein the switching circuitry includes a control input; and
a receiver operable to couple to the DC power grid in parallel with the switching circuitry, wherein:
   the receiver includes a counter and a control output coupled to the control input of the switching circuitry; and
   the receiver is operable to:
      monitor for a signal on the DC power grid;
      increment the counter in response to a failure to receive the signal;
      reset the counter in response to receiving the signal; and
      cause the switching circuitry to decouple the power source from the DC power grid in response to the counter exceeding a threshold.

12. The device of claim 11 further comprising the power source.

13. The device of claim 11 further comprising:
a transmitter operable to couple to the DC power grid and to provide the signal over the DC power grid; and
an inverter operable to:
   couple to the DC power grid in parallel with the transmitter;
   couple to an AC power grid; and
   provide power on the AC power grid using power on the DC power grid.

14. The device of claim 11, wherein the signal is in a frequency shift keying (FSK) modulated messaging protocol and encodes a sequence of bits.

15. The device of claim 14, wherein:
the signal is a first signal;
the sequence of bits is a first sequence of bits;
the receiver is operable to increment the counter in response to a failure to receive the first signal that encodes the first sequence of bits; and
the receiver is operable to ignore a second signal on the DC power grid that encodes a second sequence of bits that is different from the first sequence of bits.

16. A device comprising:
switching circuitry operable to couple a power source to a DC power grid, wherein the switching circuitry includes a control input; and
a receiver operable to couple to the DC power grid in parallel with the switching circuitry, wherein:
   the receiver includes a counter and a control output coupled to the control input of the switching circuitry; and the receiver is operable to:
monitor for a signal on the DC power grid;
increment the counter in response to receiving the signal;
reset the counter in response to a failure to receive the signal; and
cause the switching circuitry to couple the power source to the DC power grid in response to the counter exceeding a threshold.

17. The device of claim 16 further comprising the power source.

18. The device of claim 16 further comprising:
a transmitter operable to couple to the DC power grid and to provide the signal over the DC power grid; and
an inverter operable to:
couple to the DC power grid in parallel with the transmitter;
couple to an AC power grid; and
provide power on the AC power grid using power on the DC power grid.

19. The device of claim 16, wherein the signal is in a frequency shift keying (FSK) modulated messaging protocol and encodes a sequence of bits.

20. The device of claim 19, wherein:
the signal is a first signal;
the sequence of bits is a first sequence of bits;
the receiver is operable to increment the counter in response to receiving the first signal that encodes the first sequence of bits; and
the receiver is operable to ignore a second signal on the DC power grid that encodes a second sequence of bits that is different from the first sequence of bits.

* * * * *